Oct. 16, 1934.  E. H. ALLEN  1,976,978
SERVICE DRIVE MECHANISM FOR TRAILERS
Filed April 5, 1933   4 Sheets-Sheet 1
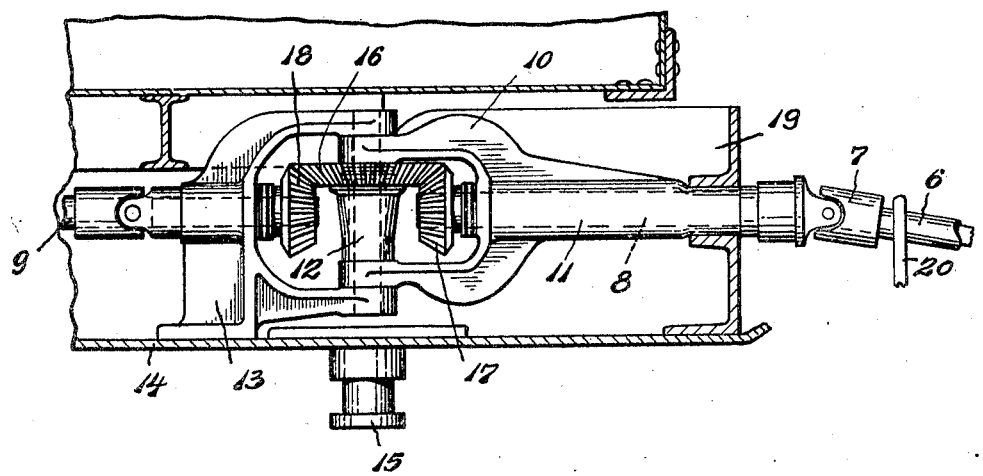
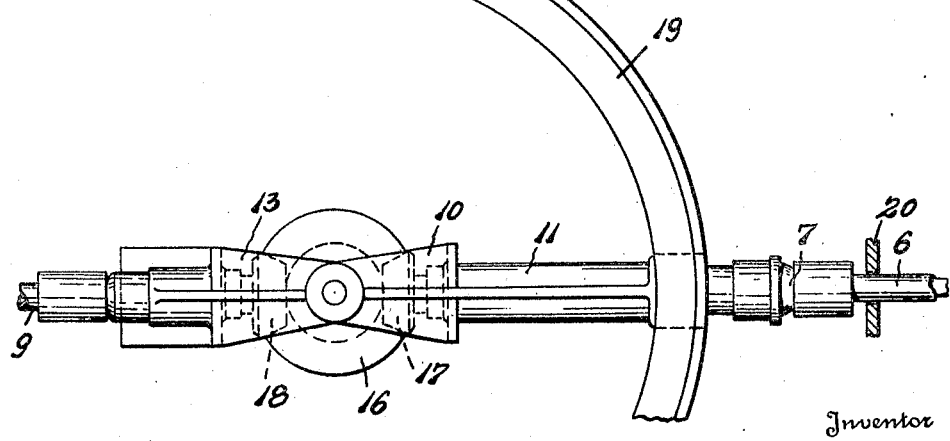
Inventor
EDWIN H. ALLEN.

Oct. 16, 1934.  E. H. ALLEN  1,976,978
SERVICE DRIVE MECHANISM FOR TRAILERS
Filed April 5, 1933  4 Sheets-Sheet 2
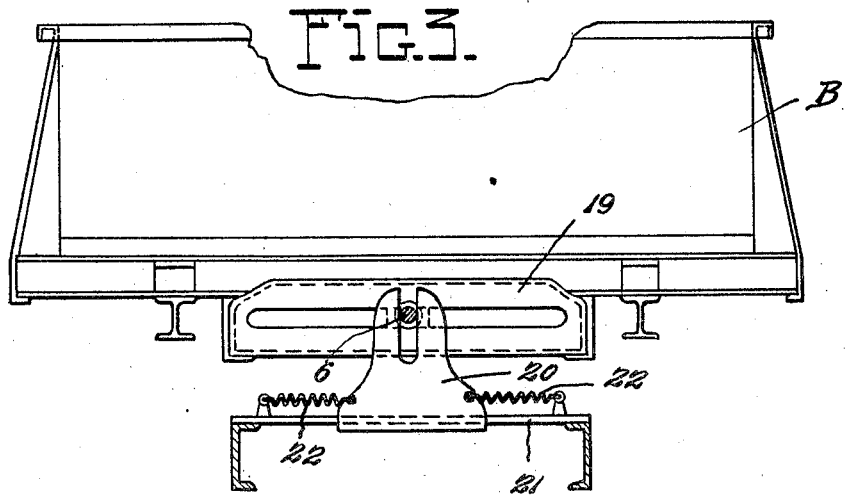
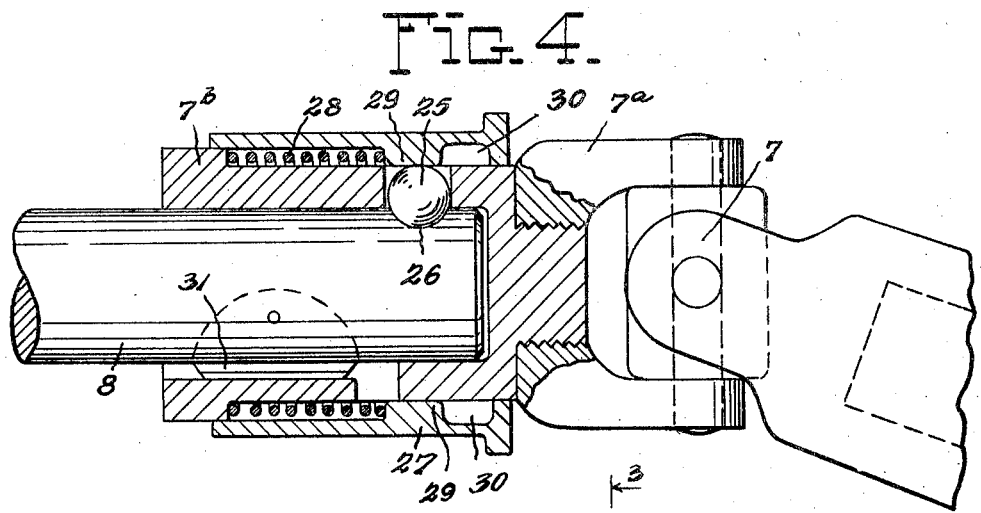
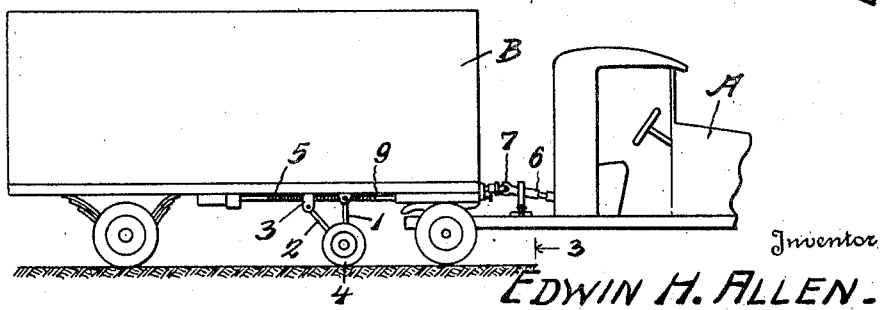
Inventor
EDWIN H. ALLEN
By Robb & Robb
Attorneys Oct. 16, 1934.  E. H. ALLEN  1,976,978
SERVICE DRIVE MECHANISM FOR TRAILERS
Filed April 5, 1933  4 Sheets-Sheet 3

Inventor
EDWIN H. ALLEN.
By Robbs Roth
Attorneys

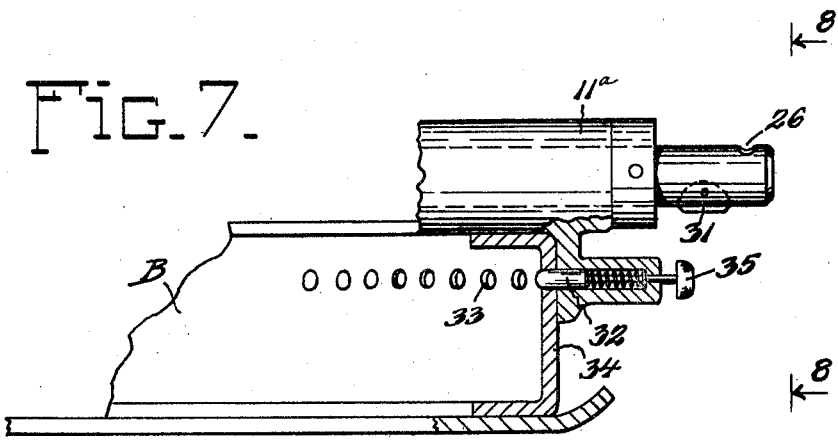
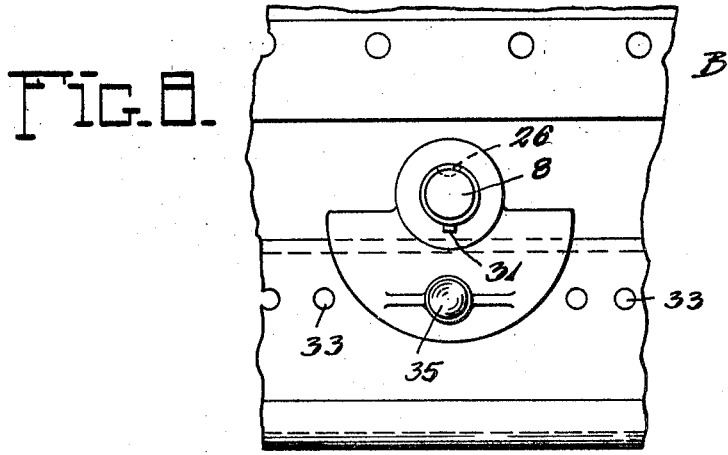
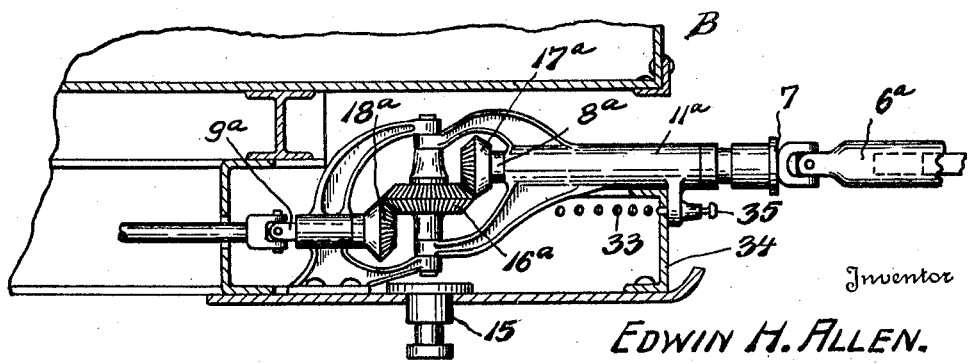

Patented Oct. 16, 1934

1,976,978

UNITED STATES PATENT OFFICE 1,976,978

SERVICE DRIVE MECHANISM FOR TRAILERS

Edwin Howe Allen, Edgerton, Wis., assignor to Highway Trailer Company, Edgerton, Wis., a corporation Application April 5, 1933, Serial No. 664,629

8 Claims. (Cl. 180—14)

This invention has relation to the art of combination tractor and trailer type vehicles. In these vehicles there is usually provided a tractor or truck vehicle intended to pull the trailer or pay load vehicle, the two being connected together by suitable fifth wheel devices, a known type of which is fully described in United States Letters Patent to Martin and Farr, No. 1,412,025.

It is desirable in certain types of these trailer vehicles to provide the same with power transmitting means, operatively arranged on the trailer body and adapted to be coupled with a power driving mechanism on the tractor, to thereby provide means for the actuation of instrumentalities on the trailer, operatively associated with such power transmitting means, for accomplishing any desired service operation of the various instrumentalities of the trailer vehicle itself or independent mechanism mounted upon the same.

With the foregoing in mind, the purpose of this invention has been to develop novel instrumentalities whereby a power driving mechanism, with which the tractor may be equipped, may be readily connected up to power driven mechanism on the trailer to do various kinds of work as to instrumentalities on the trailer, as well as to perform the necessary actuating functions for power driven means on the trailer for operation of a dumping hoist that will act upon the pay load body of the trailer to tilt it in dumping position and restore it to traveling position at will. The novel means of the invention contemplates particularly the peculiar mounting of the power driving parts on the tractor, the particular mounting of the power driven parts on the trailer, peculiar connections between the two such that the said instrumentalities when properly connected will not interfere with the necessary pivoting movement of the trailer in a horizontal plane relatively to the tractor, about the axis of the fifth wheel devices as a center.

A more full understanding of the invention will be had upon reference to the following description, in conjunction with the accompanying drawings, in which—

Figure 1 is a fragmentary sectional view of the front end portion of the trailer, showing the power driven unit which is adapted to be coupled with the power driving shaft of the tractor.

Figure 2 is a fragmentary top plan view indicating more clearly the mounting of the coupling shaft of said power driven mechanism so that it may swing in a horizontal plane incident to movement by the connection thereof with the power driving shaft carried by the tractor.

Figure 3 is a vertical sectional view taken about on the line 3—3 of Figure 5, looking rearwardly toward the front end of the trailer, and illustrating the mounting of the driving shaft guide bracket which is carried by the tractor.

Figure 4 is a side elevation of a form of slip coupling device usable intermediate the driving shaft universal joint, and the front end of the coupling shaft of the driven shaft devices used by the trailer.

Figure 6:
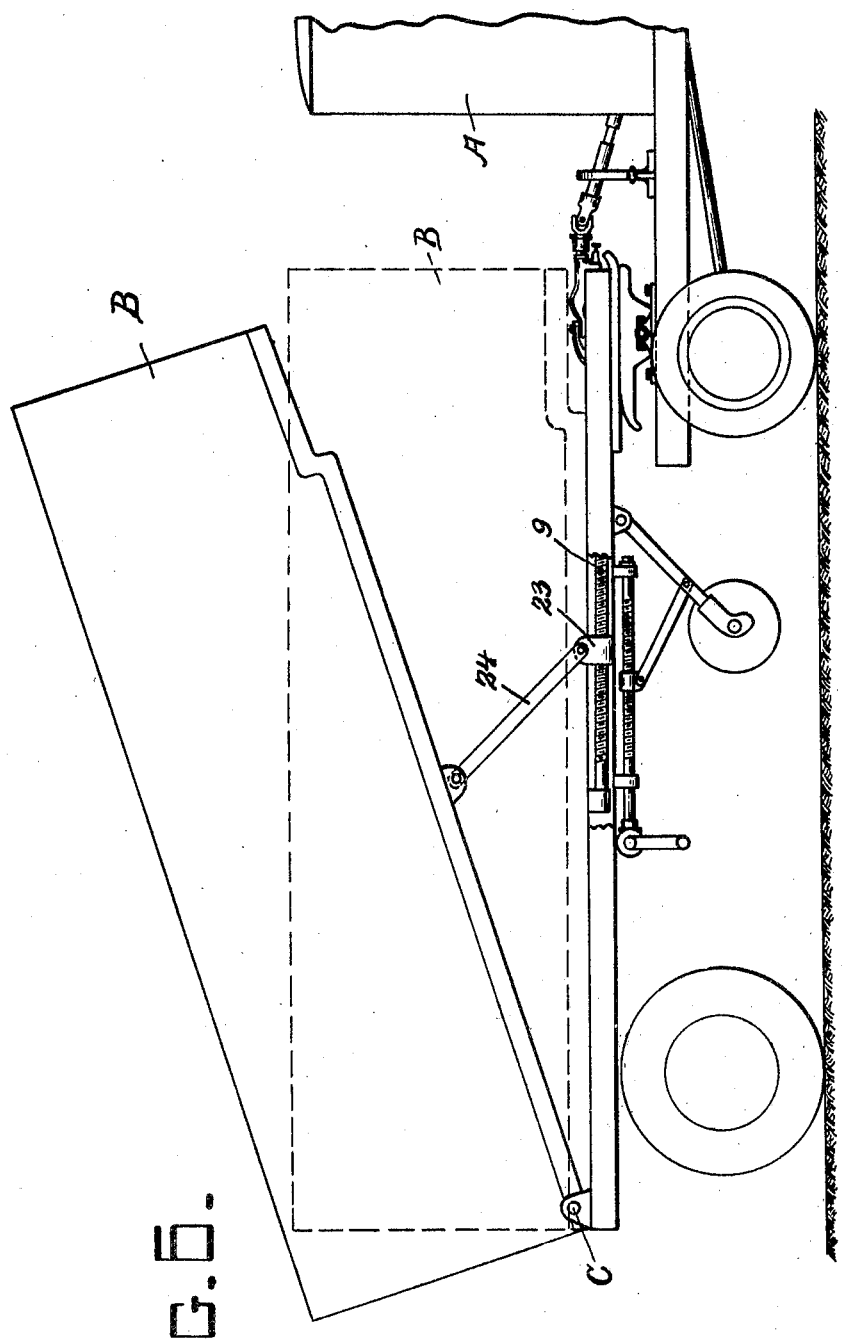

Figure 5 is a general view in side elevation of a combination tractor-trailer vehicle illustrating the application of the invention for the operation of raising and lowering a support such as practically all trailers are equipped with today, which support is to carry the front end of the trailer when disconnected from the tractor vehicle, and is designed to be raised for clearance from the ground when the tractor is connected to the trailer and the trailer is intended to travel behind the tractor.

Figure 6 is a side elevation view showing the adaptation of my mechanism for the operation of a screw type hoist to tilt the pay load body of the trailer into a dumping position.

Figure 7 is a fragmentary view, partly in section, of a modified form of mounting for the trailer coupling shaft devices.

Figure 8 is a fragmentary front elevation view of the parts shown in Figure 7.

Figure 9 is a fragmentary longitudinal sectional view of a modified arrangement of the driven shaft instrumentalities that may be used for carrying the drive of a motor driven shaft on the tractor back to the driven or service operating instrumentalities on the trailer.

Referring to Figures 5 and 6 first, it is notable that the tractor A may be of any known type and is shown associated with a pay load body or trailer B, this body in Figure 6 being of the dump tilting type pivoted at its rear end at C to the chassis or frame of the trailer. In Figure 5 the pay load body B of the trailer is not necessarily of the tilting type, but the conventional rigid, non-tilting type. In Figure 5 I illustrate a support 1 for the front end of the trailer when disconnected from the tractor A, this support being adapted to be operated by a link 2 and slide nut 3 for raising and lowering the wheels 4 thereof. A screw 5 would be employed to operate the slide or nut 3, this being a well known conventional type of operating means employed in the art and not necessitating the description of its detail.

Now the power driving instrumentalities which are the primary features of my invention, may be described as driven service devices carried by the trailer, and driving service members carried by the tractor.

Referring now to Figure 1, the driving instrumentality illustrated is a telescoping shaft 6 which may be coupled to the engine of the tractor vehicle in any well known manner so as to be driven thereby. This driving or tractor service shaft 6 is coupled by a universal joint 7 with the driven assembly which is mounted in the trailer frame by suitable bearing means, and which comprises the primary coupling shaft section 8 and the secondary operating shaft section 9 connected through gearing for power transmission. The primary shaft section 8 of the driven assembly and the secondary shaft section 9 are in actuality component parts of the trailer service shaft assembly, of which shaft section 8 is the forward, and shaft section 9, the rear service shaft. The rear portion of the universal joint 7 will be carried by the coupling shaft section 8 and said shaft section is mounted in a yoke 10 formed with a sleeve 11 that provides the bearing for the said shaft section 8. The yoke 10 is equipped with a vertical pintle member 12 that connects said yoke with a rigidly mounted yoke or frame 13 secured to the trailer frame 14. Whilst the yoke 13 is rigid, the yoke 10 with its sleeve 11 may be characterized as floatingly mounted. The reason for the mounting of the yoke 10 and its sleeve 11 in a floating manner, is to permit the shaft section 8 of the service shaft mechanism 8, 9, to swing in a horizontal plane, this being required because the tractor vehicle turns in such plane about the axis of the usual king pin 15 that connects the tractor vehicle with the trailer vehicle, said king pin 15 being located as usual near the front end of the vehicle to connect it with the lower fifth wheel on the tractor vehicle. The pintle member 12 carries a bevel gear 16 with which meshes a bevel gear 17 keyed on the rear end of the shaft section 8 of the trailer service shaft mechanism. Likewise, the gear 16 meshes with a second bevel gear 18 connected with the front end portion of the rear shaft section 9 of the trailer driven shaft assembly aforesaid. Moreover, the pintle member 12 need not be arranged substantially concentric with the axis established by the king pin 15 which connects the trailer with the tractor, and it may be sometimes preferable to place the king pin somewhat ahead of the pintle member to thereby permit a greater angular movement without the necessity of cutting out the frame of the trailer to a greater extent than shown in Figures 1 and 2.

In order to guide the shaft section 8 of the trailer service shaft means, and the yoke 10 and sleeve 11 in which said shaft is mounted, a yoke-shaped guide 19, or cut-out frame portion, is provided at the front end of the trailer frame and is seen best in Figure 1. To properly hold the drive shaft 6 in position on the tractor vehicle, there is provided a guide bracket 20 seen best in Figure 3, said guide bracket being transversely slidable on a supporting plate 21 carried by the tractor vehicle at its rear portion. Springs 22 preferably hold the guide bracket 20 centralized in its position respecting the tractor vehicle and the trailer vehicle, but permit slight lateral play of the bracket 20 in a manner readily seen.

Now referring to Figure 6 again and having in mind that the shaft 9 is a part of a service shaft assembly, it is evident that said shaft may be equipped with a screw section, the rotation of which will compel a sliding movement of the slide member 23, thereby imparting movement to the hoisting link structure 24, which is pivotally connected to the pay load body B. Thus the rotation of the shaft section 9 is capable of causing a dumping or upward tilting movement of the pay load body B and a lowering of said body in a manner self-evident from the foregoing description and from the drawings, expressly Figure 6. It may be noted in reference to Figure 5, that the sliding member 3 may be carried by the screw 5 which may be a part of the rear shaft section 9 and the rotation of the screw 5, will, by sliding movement of the slide member or nut 3, compel the raising and lowering of the wheel support 4 for the front end of the trailer B dependent upon the direction of such rotation.

Now the design of the present invention is to obtain a drive mechanism for carrying the driving forces of the shaft 6 back to the service shaft sections 8 and 9 of the driven service shaft assembly constituted by the latter parts, without employment of mechanism which requires any reorganization of special structure or king pin device on the trailer. The objective is to obtain simplicity and yet efficiency of action.

Bearing in mind the construction of the drive shaft 6 and the driven shaft parts 8 and 9, it is evident that in order to permit the tractor vehicle and the trailer vehicle to operate, the connection between the parts 6 and 8 must be readily detachable and attachable. With this in view there is contemplated to be employed some such connection as is shown in Figure 4, wherein the universal joint 7 has its rear member 7a formed of sleeve-like construction, as shown at 7b. There is provided a simple form of lock device intermediate the part 7b and the front end of the shaft section 8. This lock device takes the form of a ball 25 adapted to enter a recess 26 in the part 8 and to be held in said recess by an outer locking sleeve 27. The sleeve 27 is slidable upon the sleeve portion 7b of the universal joint part 7a and a spring 28 normally holds the sleeve 27 with its annular locking rib 29 engaged with the ball 25 to maintain the same in the recess 26, but by pushing the sleeve 27 rearwardly on the sleeve-like member 7b, comprising the spring 28, an annular groove 30 in the front end of the sleeve 27 will be brought to a position opposite the ball 25, and a forward pull upon the universal joint member 7a will cause the ball 25 to ride outward into the groove 30 and release the member 7a from the shaft 8 to which it is normally locked when the trailer and tractor are coupled together in traveling relation. In order that the rotative driving action of the shaft 6 may be transmitted to the shaft section 8 through the universal joint 7, the sleeve extension 7b of the joint member 7a must be interlocked with the shaft part 8. For this purpose a sort of spline or key member 31 is carried by the shaft part 8 and is adapted to interlock with the part 7b in such a manner as to permit separation of the parts 7b and 8 in an obvious way.

While in Figure 1 the construction of the trailer service shaft parts 8 and 9 involves these parts in substantially the same horizontal plane, for certain types of trailer frame constructions it may be desirable that these parts be in different horizontal planes and such a construction is illustrated in Figure 9, wherein the telescoping driving shaft is designated 6a and the driven shaft is comprised of the coupling shaft parts 8a and 9a. In this construction the parts 8a and 6a are in a horizontal plane above that of the part 9a. To accommodate for such construction, bevel gears 17a and 18a are used, being normally in mesh with a double bevel gear 16a that functions in a manner similar to the single bevel gear 16 of the construction illustrated in Figure 1.

Now under certain conditions it is desirable to have a coupling mechanism between the driving shaft of the tractor and the service shaft on the trailer which is to be used only when the tractor and trailer vehicles are stationary. Under such conditions a construction as disclosed in Figures 7-9 has been found very advantageous. The sleeve 11a of the service shaft 8a (see Figure 9) comprises the detent plunger 32, spring-pressed to enter a selected one of a series of openings 33 in the front end of the trailer frame or guide means 34 which functions after the manner of the guide means 19 shown in Figure 2. The detent 32 will be held in locking and unlocking positions by any suitable means and there is provided handle means 35 for said detent means.

It will therefore be seen that when the tractor and trailer vehicles are stationary the telescoping shaft 6a and service shaft 8a may be very easily interconnected by means of the universal joint of a construction shown in Figure 4, after the service shaft 8a and sleeve 11 have been brought into approximate alignment with respect to the driving shaft 6a and locked against lateral displacement on the guide 34 by means of plunger 32 as will be readily seen from Figure 9, to thereby take the side thrust of the drive. In this construction the shafts 6a and 8a are disconnected when the tractor-trailer vehicle is en route to avoid breakage of the shafts or coupling and locking instrumentalities.

It is to be borne in mind that the service device comprised by the shaft mechanism 6, 8, 9, and associated parts, may be employed for different purposes in conjunction with mechanism or devices carried by the trailer B, and I do not wish to be limited as regards the applicability of particular uses to which this device may be applied in conjunction with parts carried by the trailer save as set forth in the claims found hereinafter.

Having thus described my invention, what I claim as new and desire to secure by Letters Patent of the United States, is—

1. In a device of the class described, in combination, a tractor vehicle, a trailer vehicle, a king pin mechanism for connection of the trailer vehicle to the tractor vehicle, a service shaft on the trailer vehicle comprising pivotally connected parts, having a pivotal connection which is located in a plane above the king pin connection between the vehicles aforesaid, and a driving shaft connected with the front service shaft part and carried by the tractor vehicle, the pivotal connection between the service shaft parts being concentric with the said king pin connection between the vehicles, and comprising yokes for supporting said shaft parts, a pintle member connecting the yokes and constituting the pivot connection proper between the shaft parts, together with gearing intermediate the adjacent ends of the shaft parts.

2. In a device of the class described, in combination, a tractor vehicle, a trailer vehicle, a king pin mechanism for connection of the trailer vehicle to the tractor vehicle, a service shaft on the trailer vehicle comprising pivotally connected parts, having a pivotal connection which is located in a plane above the king pin connection between the vehicles aforesaid, a driving shaft connected with the front service shaft part and carried by the tractor vehicle, one of the service shaft parts on the trailer projecting forward from the front end thereof, and a mounting for said last mentioned shaft part permitting horizontal floating movement thereof.

3. In a device of the class described, in combination, a tractor vehicle, a trailer vehicle, a king pin mechanism for connection of the trailer vehicle to the tractor vehicle, a service shaft on the trailer vehicle comprising pivotally connected parts, having a pivotal connection which is located in a plane above the king pin connection between the vehicles aforesaid, a driving shaft connected with the front service shaft part and carried by the tractor vehicle, one of the service shaft parts on the trailer projecting forward from the front end thereof, and a mounting for said last mentioned shaft part permitting horizontal floating movement thereof, together with a universal joint connection between the front extremity of said last named shaft part and the rear end of the driving shaft on the tractor.

4. In a device of the class described, in combination, a tractor vehicle, a trailer vehicle, a king pin mechanism for connection of the trailer vehicle to the tractor vehicle, a service shaft on the trailer vehicle comprising pivotally connected parts, having a pivotal connection which is located in a plane above the king pin connection between the vehicles aforesaid, a driving shaft connected with the front service shaft part and carried by the tractor vehicle, one of the service shaft parts on the trailer projecting forward from the front end thereof, a mounting for said last mentioned shaft part permitting horizontal floating movement thereof, together with a universal joint connection between the front extremity of said last named shaft part and the rear end of the driving shaft on the tractor, and a bracket carried by the tractor cooperative with the driving shaft thereon and mounted in a floating manner on the tractor to accommodate the lateral play of the said driving shaft part.

5. In a device of the class described, in combination, a tractor vehicle, a trailer vehicle, a king pin mechanism for connection of the trailer vehicle to the tractor vehicle, a service shaft on the trailer vehicle comprising pivotally connected parts, having a pivotal connection which is located in a plane above the king pin connection between the vehicles aforesaid, a driving shaft connected with the front service shaft part and carried by the tractor vehicle, one of the service shaft parts on the trailer projecting forward from the front end thereof, a mounting for said last mentioned shaft part permitting horizontal floating movement thereof, and detent means on the front end of the trailer for locking the floating part of the service shaft against floating movement.

6. In a tractor-trailer combination wherein articulation of the vehicles is obtained through a fifth wheel coupling mechanism consisting of a part mounted on the tractor and a part mounted on the trailer for cooperative association, the combination with a power transmission system for taking power from a tractor to the trailer which comprises a drive shaft on the tractor, a floating mounting for said drive shaft, a driven assembly mounted on the trailer and comprising pivotally connecting parts having a pivotal connection which is located in a plane above the fifth wheel connection between the vehicles, means for connecting one of said parts with the drive shaft on the tractor, a mounting for said last named part, and a guide for said mounting carried by the trailer.

7. In a tractor-trailer combination, each of which carries a fifth wheel coupling part for cooperative association to permit joinder of the vehicles, the combination with a power transmitting system for taking power from the tractor to the trailer, which comprises a drive shaft on the tractor, a mounting for said drive shaft which includes a laterally shiftable part and resilient means for normally maintaining said part in a centered position, a driven shaft assembly carried by said trailer and comprising a pair of spaced shafts having gears mounted thereon, a support for each shaft, means for pivotally connecting said shafts on said supports, comprising a pin, a gear encompassing said pin and meshing with the gears on said shafts, said pin lying on the axis of rotation of the tractor vehicle with respect to the trailer vehicle and above the plane of the fifth wheel connection, one of said shafts and the mounting therefor being free to rotate about the pin, means for connecting said last named shaft and the drive shaft to the tractor, and guiding means for guiding said mounting when it moves relative to the shaft and its support.

8. In a tractor trailer combination adapted to be pivotally joined for articulated movement, a power transmission for transmitting power from the tractor to the trailer, which comprises a drive shaft on the tractor and a driven shaft on the trailer, a mounting for said driven shaft, a vertical pin to which said mounting is connected for swinging movements, a guide on the other end of said mounting, means for connecting the drive shaft to the driven shaft, and a second shaft, gearing for connecting said second shaft to said first driven shaft, and a stationary mounting for said second shaft connected to said pin, said pin lying on the axis of rotation of the said vehicles.

EDWIN HOWE ALLEN.